(12) United States Patent
Boulay

(10) Patent No.: US 6,499,778 B2
(45) Date of Patent: Dec. 31, 2002

(54) TELESCOPING WIRE RETRIEVING TOOL

(76) Inventor: Robert Boulay, 155 Meadowvale Road, Scarborough, Ontario (CA), M1C 1S2

( * ) Notice: Subject to any disclaimer, the term of this patent is extended or adjusted under 35 U.S.C. 154(b) by 0 days.

(21) Appl. No.: 09/880,092

(22) Filed: Jun. 14, 2001

(65) Prior Publication Data

US 2002/0014776 A1 Feb. 7, 2002

(30) Foreign Application Priority Data

Jun. 14, 2000 (CA) .............................................. 2311723

(51) Int. Cl.[7] .................................................. B25J 1/00
(52) U.S. Cl. .................. 294/26; 294/19.1; 254/134.3 R
(58) Field of Search ................. 294/3.6, 19.1, 294/23.5, 26; 119/801, 802; 254/134.3 R, 134.3 FT, 134.7

(56) References Cited

U.S. PATENT DOCUMENTS

| 291,177 A | * | 1/1884 | Felt ............................ 119/801 |
| 1,208,624 A | * | 12/1916 | Newman ..................... 119/801 |
| 2,291,593 A | * | 7/1942 | Hubbard ..................... 294/19.1 |
| 2,889,797 A | * | 6/1959 | Fox ............................ 294/26 X |
| 3,182,960 A | * | 5/1965 | French .................. 294/19.1 X |
| 3,433,521 A | * | 3/1969 | Lasko ........................ 294/19.1 |
| 3,891,188 A | * | 6/1975 | Peirce ................. 254/134.3 R |
| 5,487,576 A | * | 1/1996 | DuVivier .................. 294/26 X |
| 5,558,377 A | * | 9/1996 | Blum et al. ................. 294/19.1 |
| 5,915,770 A | * | 6/1999 | Bergstrom ................. 294/19.1 |
| 6,065,787 A | * | 5/2000 | Jarosch ...................... 294/19.1 |

* cited by examiner

Primary Examiner—Johnny D. Cherry

(57) ABSTRACT

The present invention is directed to a telescoping tool to aid in pulling wire through openings during wire installation in existing premises. The tool comprises a telescoping handle having a plurality of individual sections stacked one within the other. Each section has a first exposed end and a second end contained within the handle. The exposed end of the inner most section of the telescoping handle is provided with a wire receiving hook attached thereto for hooking a wire and allowing it to be pulled through an opening.

5 Claims, 3 Drawing Sheets

TELESCOPING WIRE RETRIEVING TOOL

FIELD OF THE INVENTION

The present invention is related to a telescoping tool to aid in pulling wire through an opening during wiring installation in an existing premise.

BACKGROUND OF THE INVENTION

During installation of new wiring in existing premises, it is necessary to pull the wire through openings in partition walls or ceilings. Typically, for long runs of wire, the installer will utilize a wire snake to pull or feed the wire through the partition walls and ceilings. For shorter runs of wire, it is common that the installer will utilize a metal clothes hanger, rebending the hanger to be elongated with a hook on one end to hook the wire and pull the wire through the opening. The use of such rebent wire clothes hanger offers disadvantages in that the elongated hanger may be difficult to manipulate through the opening to enable the hook to grasp the wire. Additionally, it is common that the hook on the end of the wire will catch on the edges of the openings or on other wires that may be within the partition wall. The use of such a rebent coat hanger requires very careful manipulation to retrieve the wire.

A number of telescoping retrieval tools have been proposed having a telescoping handle with a clip, adhesive member or magnet attached to the end to enable the tool to be extended and retrieve objects in places which are otherwise accessible. Examples of such telescoping retrieval tools are given in U.S. Pat. Nos. 5,558,377, 5,647,623 and 6,065,787 among others. While U.S. Pat. No. 6,065,787 describes a hook attachment for the telescoping tool, the hook is described for use in retrieving clothes and similar items or objects with too great a mass to be retrieved by the magnetic or adhesive member.

There thus remains a need for an easy to use retrieval tool for pulling wire through openings in partition walls and ceilings during wire installations.

SUMMARY OF THE INVENTION

The present invention is directed to a telescoping tool to aid in pulling wire through openings during wire installation in existing premises. The tool comprises a telescoping handle having a plurality of individual sections stacked one within the other. Each section has a first exposed end and a second end contained within the handle. The exposed end of the inner most section of the telescoping handle is provided with a wire receiving hook attached thereto for hooking a wire and allowing it to be pulled through an opening.

BRIEF DESCRIPTION OF THE DRAWINGS

Preferred embodiments of the wire retrieving tool of the present invention is illustrated in the attached drawings in which.

DETAILED DESCRIPTION OF THE PREFERRED EMBODIMENTS

Figure 1:
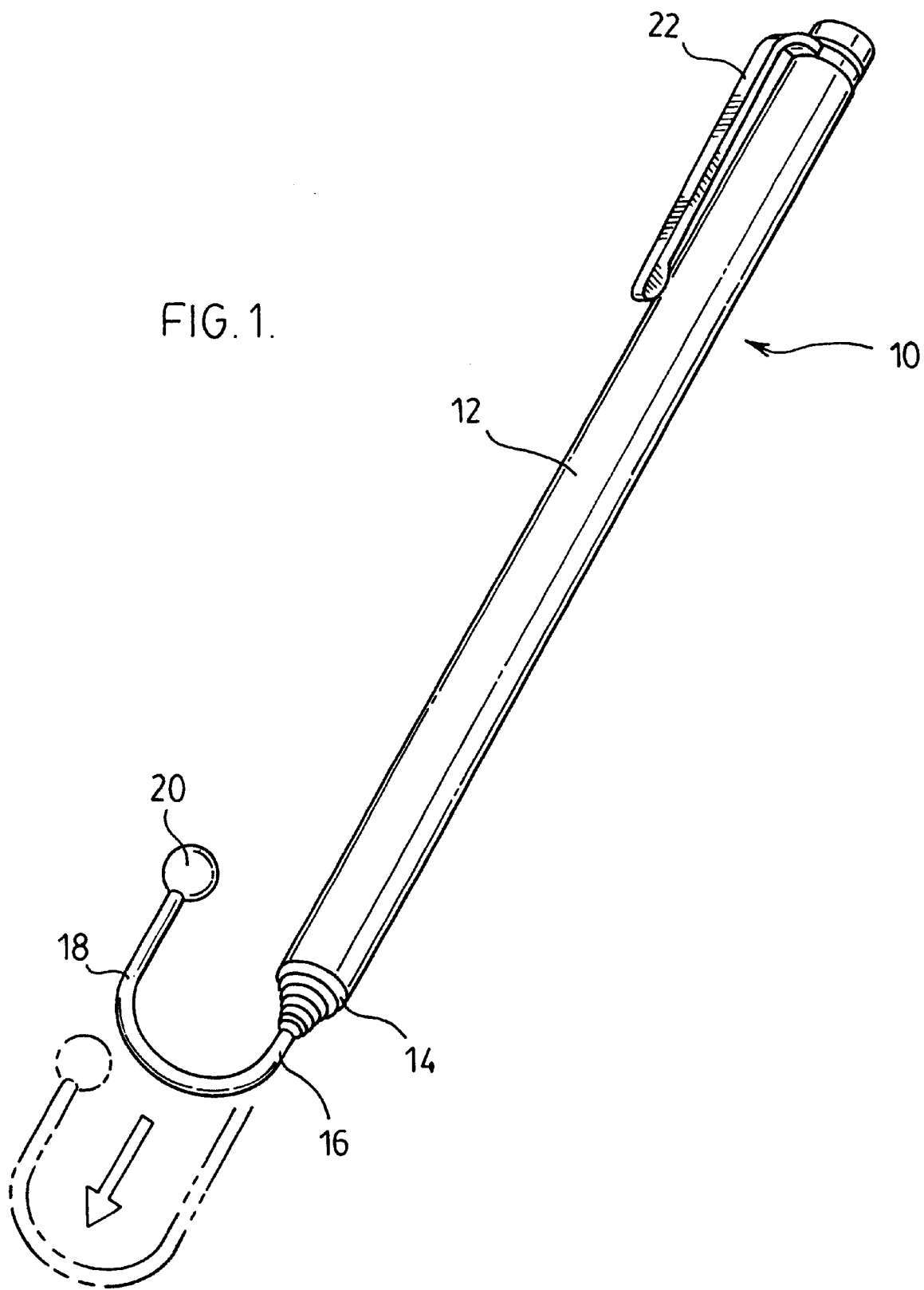
FIG. 1 is a perspective view of the wire retrieval tool of the present invention in its collapsed state.

FIG. 1 illustrates a preferred embodiment of the telescoping wire pulling tool of the present invention generally indicated by the numeral 10. The wire pulling tool 10 is utilized to pull a wire through an opening in a partition wall or other existing structure through which a wire must be pulled as will be described further below.

Figure 2:
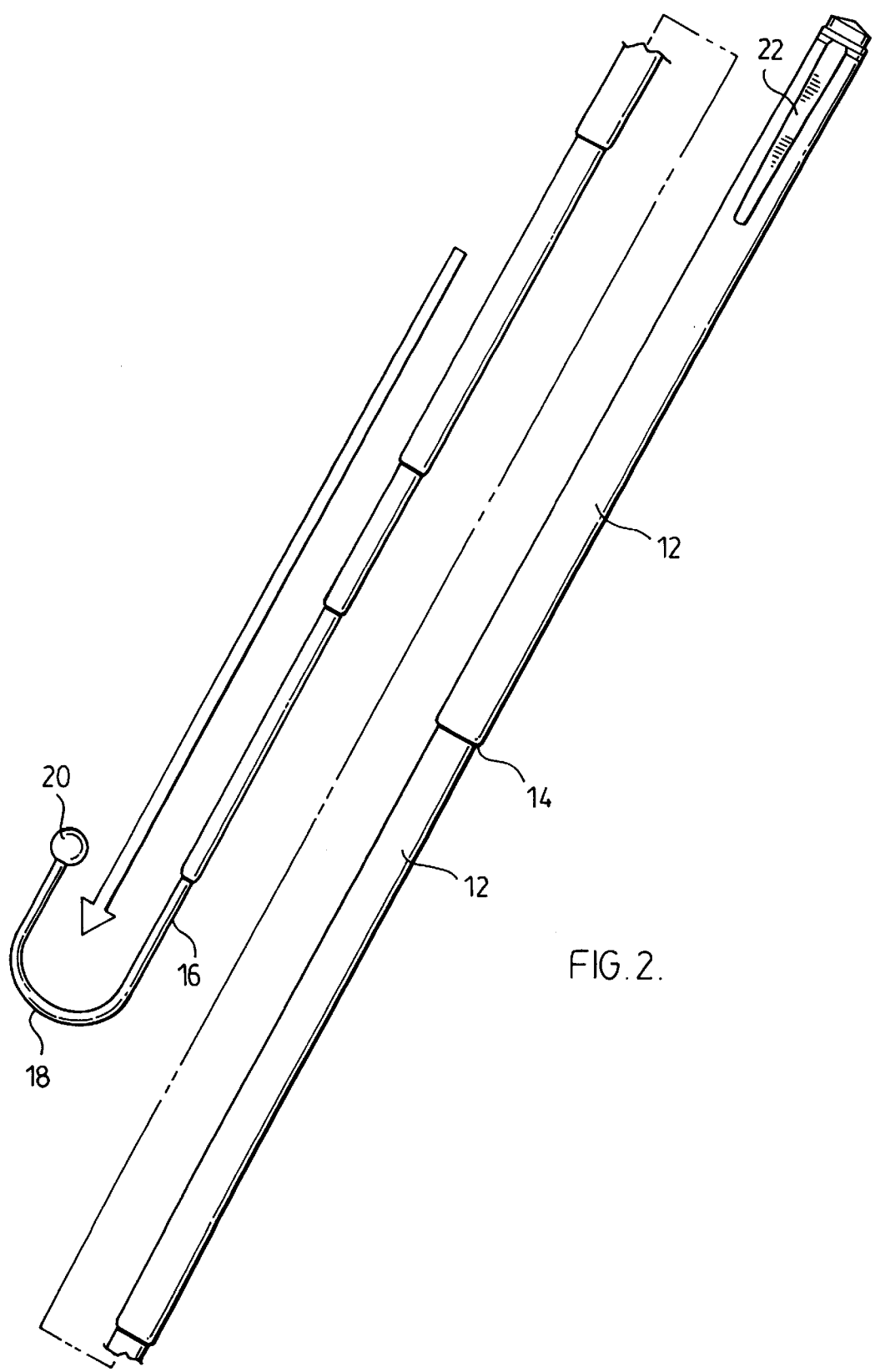
FIG. 2 is a perspective view of the wire retrieval tool of the present invention in its elongated state.

The wire pulling tool 10 has a plurality of telescoping members 12 which are sleeved and coupled to one another. The telescoping member are hollow and are prevented from sliding loose from one another by a series of inward flares 14 on one end and outward flares (not shown) on the other end of each of the telescoping members. As shown in FIG. 2, the telescoping members may be slid apart until the flare on opposite ends of each of the adjacent members engage one another to provide for the extended position of the wire pulling tool 10.

The wire pulling tool 10 may have any cross section that permits the telescoping members 12 to slide and thereby allow the tool 10 to extend and retract. While the telescoping member 12 may be square, triangle and/or round in cross section, preferably the telescoping member 12 are circular in cross section.

The innermost telescoping member 16 is provided with a wire receiving hook 18 to engage a wire to be pulled and allow the wire to be pulled toward the user of the tool 10. The hook 18 is sized to enable it to engage commonly utilized wire such as communication network, and utilizing wires. Preferably, the hook 18 is formed as an extension of the end of the innermost telescoping member 16.

In order to reduce the possibility of the wire pulling tool 10 being caught on another wire or on surfaces of the partitions through which the wire is being pulled, the end of the hook 18 is provided with an enlarged smooth surface to allow the hook to slide along any surface with which is becomes engaged. As illustrated in FIG. 2, preferably this enlarged surface is provided by a round ball 20 attached to the end of the hook 8; however, other structures are also possible.

The wire pulling tool 10 may also be provided with a clip 22 at the end distal of the hook 18 to allow the tool to be clipped to the pocket of the user or a pocket of a tool belt which the user may he carrying.

Figure 3:
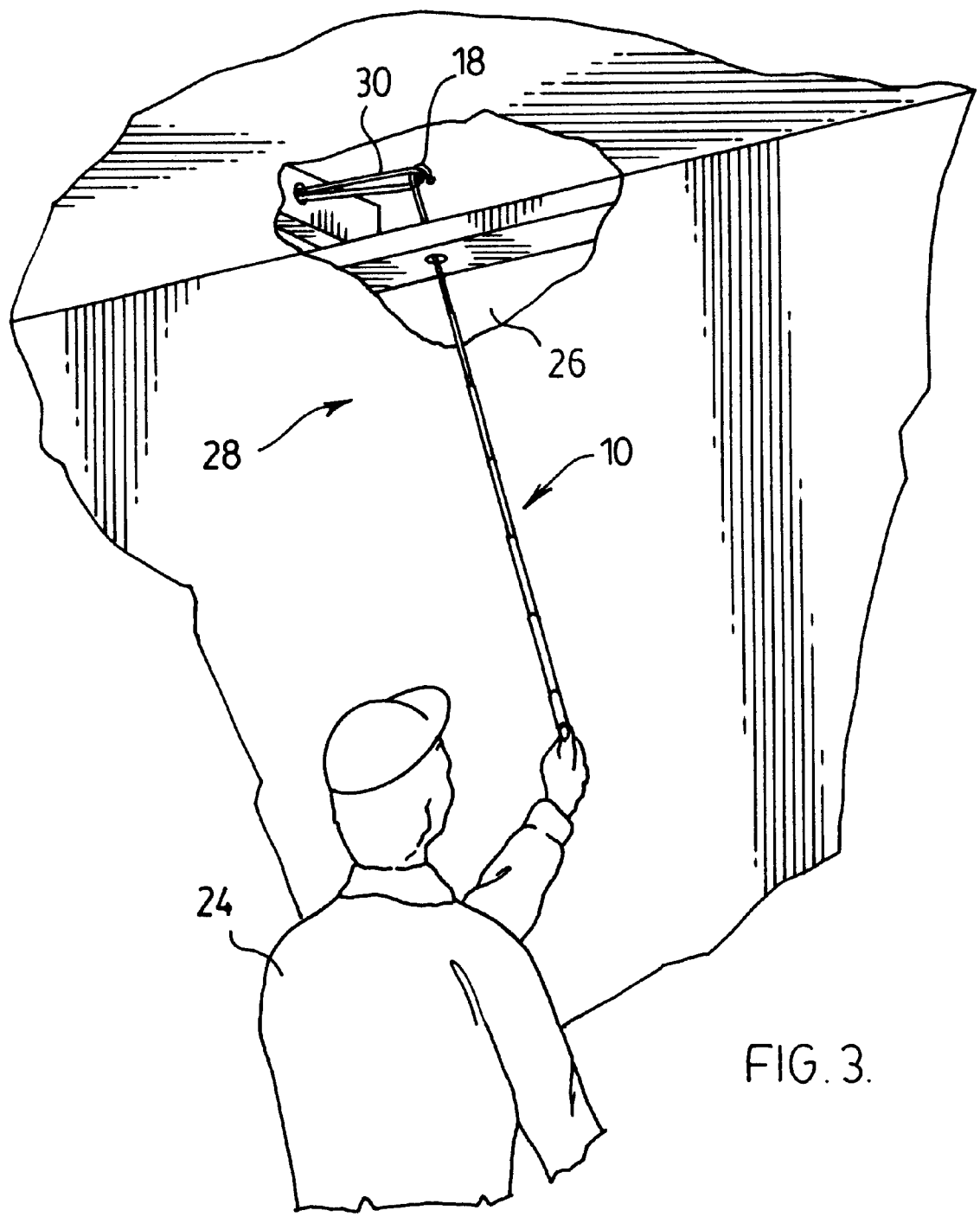
FIG. 3 is a perspective view of a user utilizing the telescoping wire retrieval tool of the present invention.

The operation of the wire pulling tool 10 of the present invention will now be illustrated with reference to FIG. 3. A user 24 extends the wire pulling tool 10 and passes the hook 18 of the tool through an opening 26 in a partition wall 28 through which the wire 30 is to be pulled. The user 24 manipulates the tool 10 until the hook 18 engages the wire 30 to be pulled through the opening 26. At this point, the user 24 pulls the tool 10 back through the opening 26 pulling the wire 30 engaged within the hook 18 through the opening 26 to the position desired. When the user 24 is finished with the tool 10, the tool 10 may be collapsed and placed in the pocket of the user 24 or in a pocket of a tool belt carried by the user.

The wire pulling tool of the present invention provides numerous advantages to a user of the tool. The tool being easily extendible and collapsible is easily carried by the user and, when needed for pulling wires, is easily extended to pull the wire through the opening. Once the wire has been pulled, the tool is easily collapsible and then returned to its storage place on the user.

The wire pulling tool of the present invention is preferably constructed of a material which will provide it with sufficient strength and rigidity to enable the user to easily manipulate it through the opening through which the wire is to be pulled to allow the user to engage the wire and pull it through the opening. The tool is somewhat flexible to allow the user to manipulate the tool easily. Preferably, the telescoping members of the wire pulling tool are constructed of a suitable thin walled metal such as a stainless steel or aluminum; however, they may also be manufactured of a suitable polymeric material which will provide the required strength and rigidity while maintaining some flexibility. The material chosen for the wire pulling tool should have the strength to allow the telescoping members to be remained in an engaged position while using the tool and not be pulled apart by the force exerted on the sections when pulling a wire through the opening. For these reasons, it is preferred that the tool be manufactured of a suitable thin walled metal material.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A telescoping tool to aid in pulling wire through an opening in a partition during installation of the wire, the tool comprising a telescoping handle having a plurality of individual sections stacked one within the other, each section being freely movable between an extended and retracted position and having a first exposed end and a second end contained within the handle, an innermost section having the first exposed end extending beyond the stacked sections and being bent to form a wire receiving hook for capturing a wire and allowing it to be pulled through an opening in a partition.

2. A telescoping tool according to claim 1 wherein the exposed end of the hook formed from the innermost section is provided with an enlarged smooth surface to allow the hook to slide along any surface it may contact.

3. A telescoping tool according to claim 2 wherein the enlarged smooth surface is provided by a round ball attached to the exposed end of the hook.

4. A telescoping tool according to claim 3 wherein the handle at the second end distal the hook is provided with a clip to enable the tool to be clipped to a pocket.

5. A telescoping tool according to claim 4 wherein the telescoping sections are circular in cross section.

* * * * *